(12) United States Patent
Tung

(10) Patent No.: US 7,142,995 B2
(45) Date of Patent: *Nov. 28, 2006

(54) METHOD FOR READING BATTERY STATUS BY OPERATION SYSTEM OF PORTABLE COMPUTER

(75) Inventor: Yu-Chih Tung, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/097,326

(22) Filed: Apr. 4, 2005

(65) Prior Publication Data

US 2005/0171711 A1   Aug. 4, 2005

Related U.S. Application Data

(63) Continuation-in-part of application No. 10/390,003, filed on Mar. 18, 2003, now Pat. No. 6,892,146.

(51) Int. Cl.
*G01R 31/36* (2006.01)
*H02J 7/00* (2006.01)

(52) U.S. Cl. .............................. 702/63; 320/134

(58) Field of Classification Search ................ 702/63, 702/60, 61, 62; 713/300, 310, 320, 321, 713/340; 320/134, 136; 700/297
See application file for complete search history.

(56) References Cited

U.S. PATENT DOCUMENTS

| 5,408,423 A | * | 4/1995 | Kawagishi | 713/321 |
| 6,771,042 B1 | * | 8/2004 | Chen et al. | 320/110 |
| 6,892,146 B1 | * | 5/2005 | Tung | 702/63 |
| 6,928,567 B1 | * | 8/2005 | Nakai | 713/340 |

* cited by examiner

*Primary Examiner*—Michael Nghiem
*Assistant Examiner*—Toan M. Le
(74) *Attorney, Agent, or Firm*—Rosenberg, Klein & Lee (57) ABSTRACT

A method for reading battery status of a portable computer that is powered by a battery and has an operation system which reads the status of the battery by a keyboard controller in accordance with a preset time reference. The operation system reads the current system time first which is then compared with the time value when the operation system previously reads the battery status. A time difference between the current system time and the previous time of reading is obtained which is compared with the time reference. If the time difference is greater than or equal to the time reference, the operation system actually reads the battery status and stores the status in a system memory. If the time difference is smaller than the time reference, the operation system simply retrieves the battery status stored in the system memory and feeds the status to the operation system.

6 Claims, 6 Drawing Sheets

METHOD FOR READING BATTERY STATUS BY OPERATION SYSTEM OF PORTABLE COMPUTER

CROSS-REFERENCES TO RELATED APPLICATIONS

This application is a continuation-in-part of Ser. No. 10/390,003 now U.S. Pat. No. 6,892,146 filed Mar. 18, 2003 entitled "Method for Reading Battery Status by Operation System of Portable Computer".

BACKGROUND OF THE INVENTION

1. Field of the Invention

The present invention relates generally to a method for reading battery status of a battery of a portable computer, and in particular to a method for reading battery status of the portable computer in order to save system resources of a central processing unit of the portable computer.

2. Description of the Prior Art

Windows-based operation systems, such as Windows XP, Windows 2000, both being available from Microsoft Corporation, are currently used in computers. The Windows-based operation systems include the Advanced Configuration and Power Interface (ACPI) for power management. The ACPI controls the power management for hardware of the computer system, including notebook computers, desktop computers and server computers.

The ACPI is a standard power management system interface developed by the computer industry, serving as a common power management interface between the computer operation system (software) and the computer (hardware). The standard power management interface allows the computer manufacturers and designers to share the same power management technique for software portability. The ACPI allows the operation system to manage the power consumption of peripheral devices of a computer system based on a predetermined algorithm. For example, the ACPI commands a hard disk drive to enter "power saving mode" or simply shutting down the hard disk drive if it is not operated for a predetermined period of time. The hard disk drive is only allowed to resume operation if it is desired by a computer user.

A primary advantage of a portable computer, such as a notebook computer, is the portability, which allows a user to carry the computer with him or her. Due to the portability, the portable computer is powered by internal power sources, such as a battery. Since the battery has a limited power capacity, power management of the battery becomes an important issue of vital importance for the portable computer.

Typically, the portable computer comprises a central processing unit operating with a System Basic Input Output System (commonly referred to as BIOS) and a keyboard controller. The keyboard controller comprises an embedded micro-controller, a Keyboard Basic Input Output System (commonly referred to as Keyboard BIOS), memory and other interfaces. As mentioned previously, the portable computer is powered by a built-in power source, such as a battery. To monitor the status of the battery, the keyboard controller comprises a battery status monitoring interface. The ACPI-based operation system of the portable computer accesses the battery status information of the keyboard controller via ACPI machine language (AML).

The operation system or system BIOS of the portable computer is designed to read the battery status 2–3 times consecutively. However, due to the fact that the keyboard controller is a device that operates slower than the central processing unit of the computer system, when the central processing unit is scheduled to read the battery status at the same moment that it is busy with a particular task, such as playing Digital Video Device (DVD), a temporary pause of the DVD image may be observed. In other words, periodically reading battery status may slow down the performance of the computer.

SUMMARY OF THE INVENTION

In view of the foregoing drawbacks that the performance of the computer is slowed down when the operation system is reading battery status, the present invention is aimed to provide a method for reading the battery status without causing undesired influence on the performance of the computer.

Another object of the present invention is to provide a method for reading battery status of a battery coupled to a portable computer, which, together with the characteristics and variation of capacity of the battery, allows for efficiently managing computer resources of the central processing unit and effectively monitoring and managing of the power of the battery.

To achieve the above objects, in accordance with the present invention, there is provided a method for reading battery status of a portable computer, wherein the portable computer is powered by a battery and comprises an operation system which reads the status of the battery by means of a keyboard controller in accordance with a preset time reference. The operation system reads the current system time first. The current system time is then compared with the time value when the operation system previously reads the battery status and a time difference between the current system time and the previous time of reading is obtained. The time difference is compared with the time reference. If the time difference is greater than or equal to the time reference, the operation system actually reads the battery status by means of the keyboard controller and stores the battery status in a system memory of the portable computer. The battery status so read is fed back to the operation system. If the time difference is smaller than the time reference, the operation system simply accesses the system memory and retrieves the battery status stored in the system memory and feeds the battery status retrieved from the system memory back to the operation system thereby saving time of actually reading the status from the battery.

BRIEF DESCRIPTION OF THE DRAWINGS

The present invention will be apparent to those skilled in the art by reading the following description of the best mode for carrying out the invention, with reference to the attached drawings, in which.

DETAILED DESCRIPTION OF THE PREFERRED EMBODIMENTS

Figure 1:
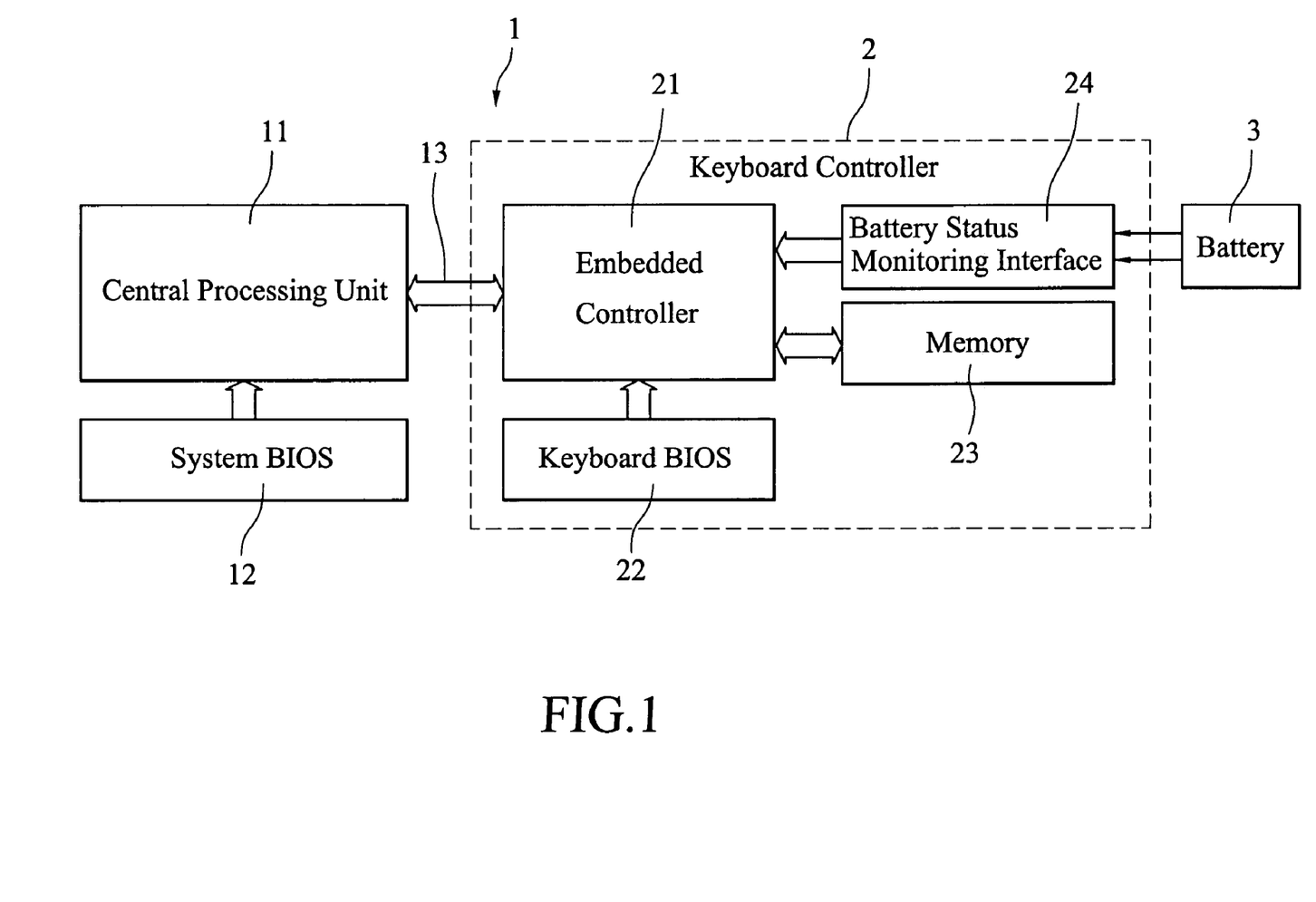
FIG. 1 is a system block diagram of a portable computer in which a method for reading battery status by operation system of the computer in accordance with a first embodiment of the present invention is embedded.

With reference to the drawings and in particular to FIG. 1, a portable computer 1 comprises a central processing unit 11, a system BIOS 12, and a keyboard controller 2. The keyboard controller 2 comprises an embedded controller 21, a keyboard BIOS 22, a memory 23, and a battery status monitoring interface 24 connected to a battery 3.

The portable computer 1 comprises hardware devices, such as floppy disk drive, hard disk drive, PCMCIA port, display. Hardware devices connected to the keyboard controller 2 includes battery, temperature sensor, keyboard and mouse. The keyboard controller 2 is coupled to the central processing unit 11 by a bus 13, such as an IDE bus. Typically, the address of the transmission ports between the keyboard controller 2 and the central processing unit 11 are 60H/64H and 62H/66H of which the 60H/64H transmission port is provided for transmission of data between the computer system and the keyboard controller, while the 62H/66H transmission port is for transmission of communication signals between the computer system and the keyboard controller.

The portable computer 1 is powered by the battery 3. The status of the battery 3 is monitored by the battery status monitoring interface 24 of the keyboard controller 2. With an ACPI based operation system, the operation system of the computer 1 periodically reads the battery status from the keyboard controller 2 via ACPI machine language (AML). The period that the operation system reads the battery status is about 2 seconds. Alternatively, the battery status may be read by means of another known battery management approach, such as Advanced Power Management (APM), with an APM based system BIOS.

Figure 2:
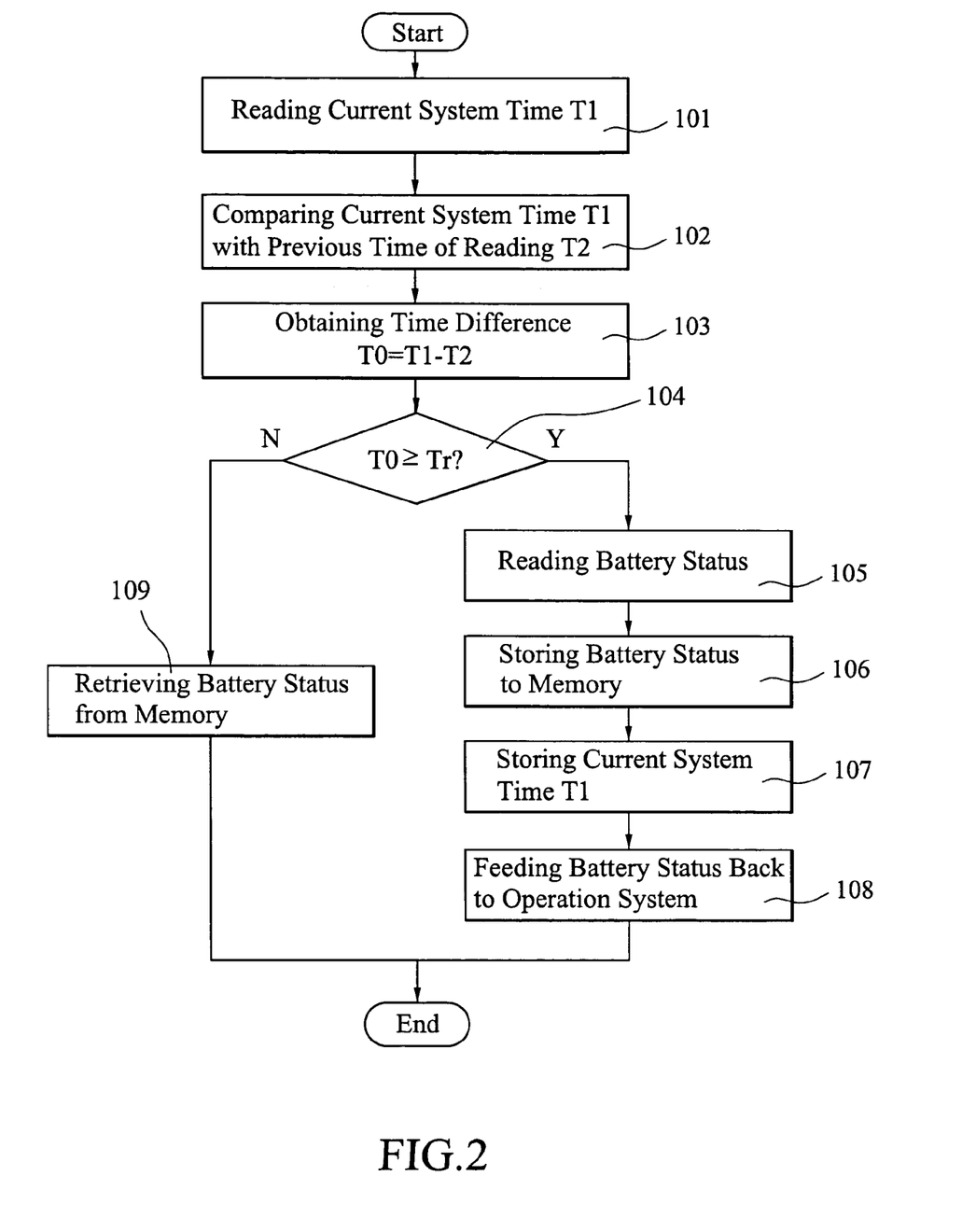
FIG. 2 is a flow chart of the method for reading battery status by the operation system in accordance with the first embodiment shown in FIG. 1.

FIG. 2 shows a flow chart of a method for reading the battery status by the operation system in accordance with the first embodiment shown in FIG. 1. In step 101, the operation system of the portable computer 1 reads the current system time T1 of the computer system. In step 102, the current system time T1 is compared with a time value T2 when the operation system previously read the battery status. A time difference is obtained, namely T0=T1-T2, where T0 is the time difference, in step 103.

In step 104, the obtained time difference T0 is compared with a preset time reference Tr. If the time difference T0 is greater than or equal to the time reference Tr, the operation system of the computer 1 reads the status of the battery 3 through the battery status monitoring interface 24 of the keyboard controller 2, step 105, and stores the reading of the battery status to the memory 23 of the keyboard controller 2, step 106. The operation system also stores the current system time T1, step 107, for comparison in the next time of reading the battery status. The reading of the battery status is then fed back to the operation system of the computer 1, step 108.

If the comparison in step 104 indicates that the time difference T0 is smaller than the time reference Tr, the operation system of the computer 1 simply retrieves the data stored in the memory 23 of the keyboard controller 2 as the battery status and feeds the so retrieved battery status back to the operation system, step 109. No truly detecting the battery status by the keyboard controller 2 is performed. This saves the computer resources of the central processing unit.

Since the power level of the battery does not change much in a period of two seconds. The change is about 2 mA/h in two seconds. Thus, in accordance with the present invention, when the operation system attempts to successively read battery status in a period of two seconds, only the first reading is truly performed over the battery 3 and the remaining readings are obtained by simply retrieving the data stored in the memory of the keyboard controller. No time is wasted in repeating the detection of the battery status over the battery in such a short period. Thus, the resources of the central processing unit are saved.

Figure 3:
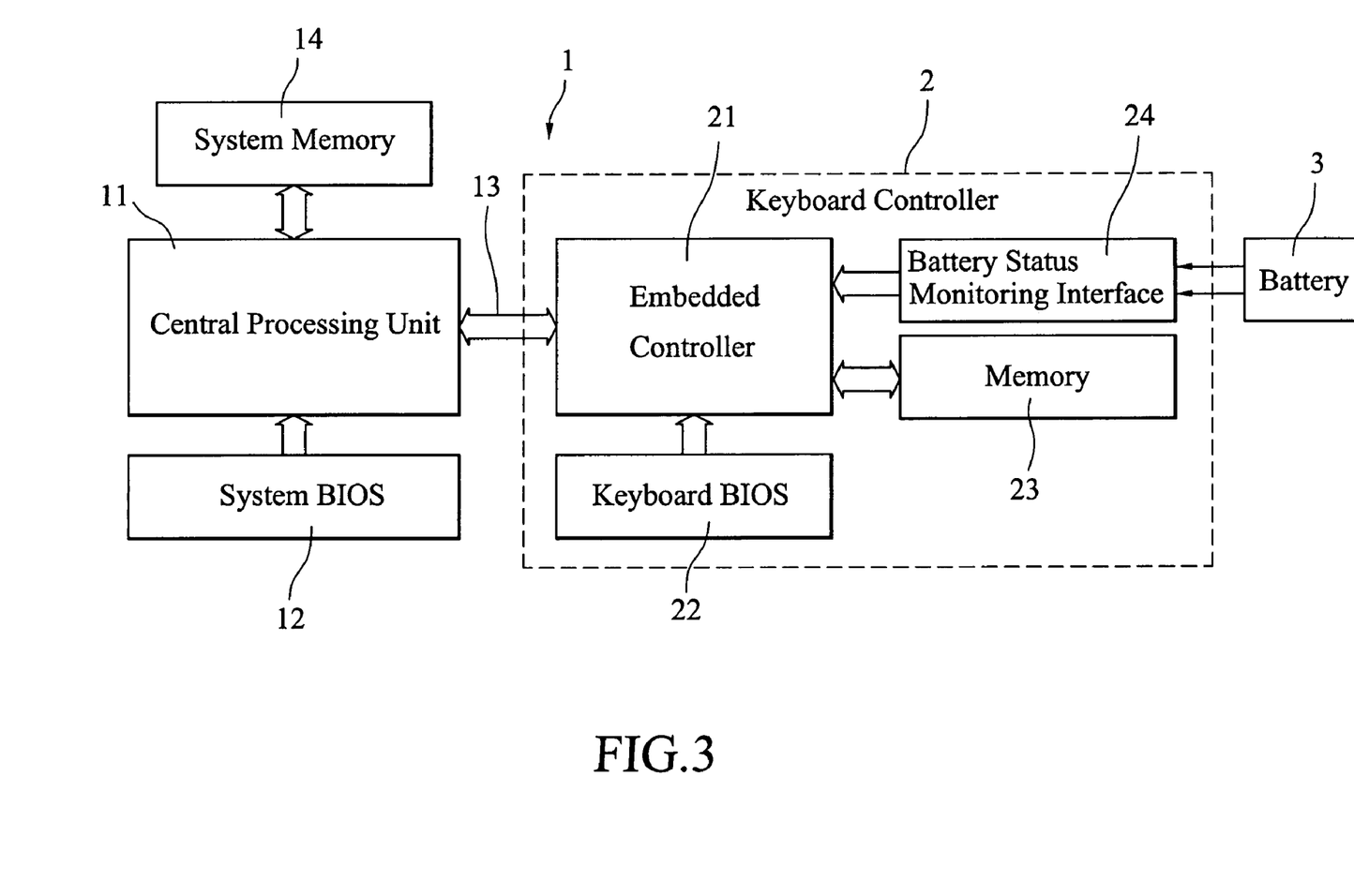
FIG. 3 is a system block diagram of a portable computer in which a method for reading battery status by operation system of the computer in accordance with a second embodiment of the present invention is embedded.

FIG. 3 is a system block diagram of a portable computer in which a method for reading battery status by operation system of the computer in accordance with a second embodiment of the present invention is embedded. It shows that a system block diagram that is substantially similar to the first embodiment of the present invention described above. Like numeral references are used to identify elements that are similar or identical in the two embodiments.

The portable computer 1 in this embodiment comprises a central processing unit 11, a system BIOS 12, a system memory 13, and a keyboard controller 2. The system memory 13 is incorporated to the central processing unit 11. The keyboard controller 2 comprises an embedded controller 21, a keyboard BIOS 22, a memory 23, and a battery status monitoring interface 24 connected to a battery 3.

The portable computer 1 is powered by the battery 3. The status of the battery 3 is monitored by the battery status monitoring interface 24 of the keyboard controller 2. With an ACPI based operation system, the operation system of the computer 1 periodically reads the battery status from the keyboard controller 2 via ACPI machine language (AML). The period that the operation system reads the battery status is about 2 seconds.

Figure 4:
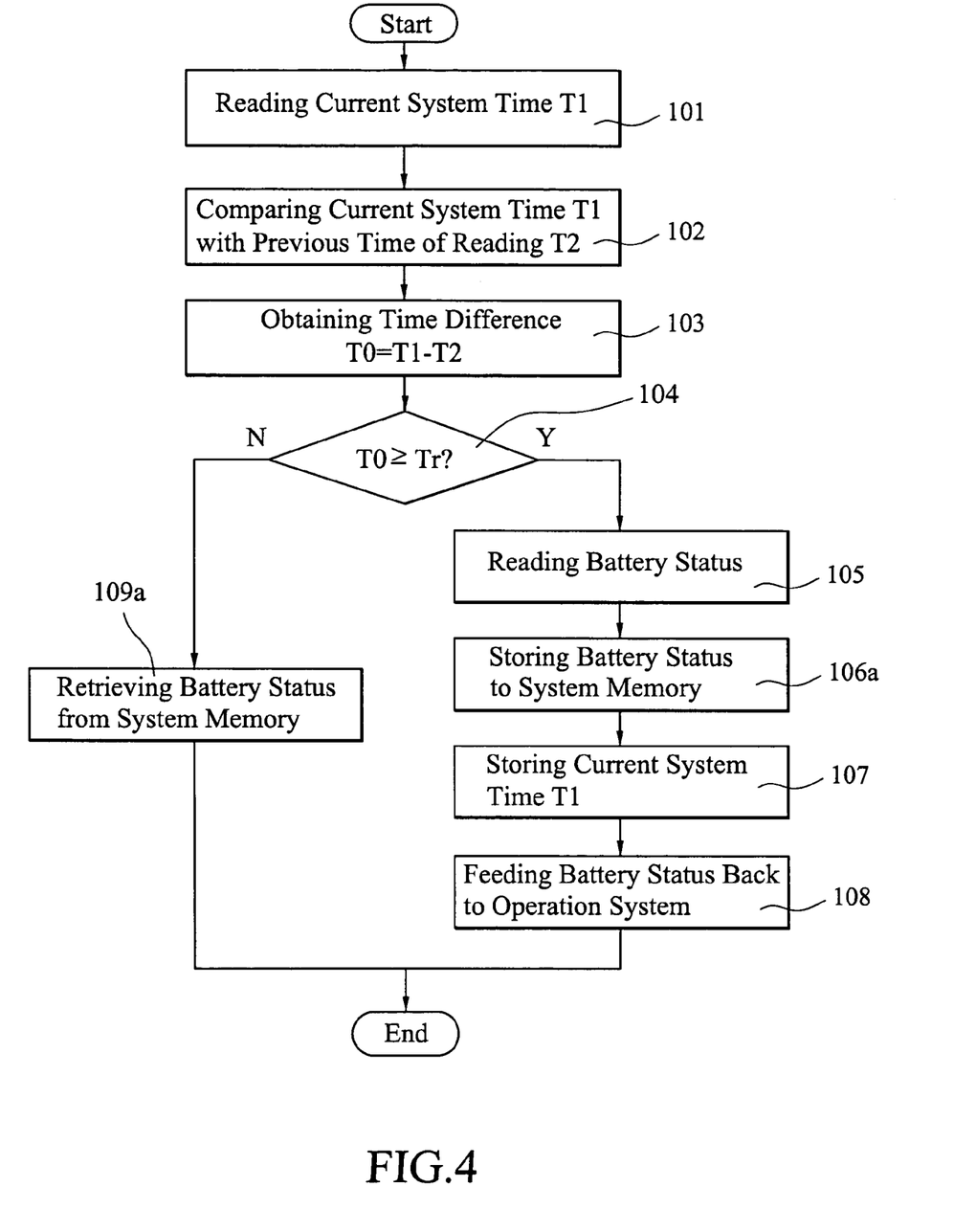
FIG. 4 is a flow chart of the method for reading battery status by the operation system in accordance with the second embodiment shown in FIG. 3.

FIG. 4 shows a flow chart of a method for reading the battery status by the operation system in accordance with the second embodiment shown in FIG. 3. In step 101, the operation system of the portable computer 1 reads the current system time T1 of the computer system. In step 102, the current system time T1 is compared with a time value T2 when the operation system previously read the battery status. A time difference is obtained, namely T0=T1-T2, where T0 is the time difference, in step 103.

In step 104, the obtained time difference T0 is compared with a preset time reference Tr. If the time difference T0 is greater than or equal to the time reference Tr, the operation system of the computer 1 reads the status of the battery 3 through the battery status monitoring interface 24 of the keyboard controller 2, step 105, and stores the reading of the battery status to the system memory 14 which is incorporated to the central processing unit 11, step 106a. The operation system also stores the current system time T1, step 107, for comparison in the next time of reading the battery status. The reading of the battery status is then fed back to the operation system of the computer 1, step 108.

If the comparison in step 104 indicates that the time difference T0 is smaller than the time reference Tr, the operation system of the computer 1 simply retrieves the data stored in the system memory 14 which is incorporated to the central processing unit 11 as the battery status and feeds the so retrieved battery status back to the operation system, step 109a. No truly detecting the battery status by the keyboard controller 2 is performed. This saves the computer resources of the central processing unit.

Figure 5:
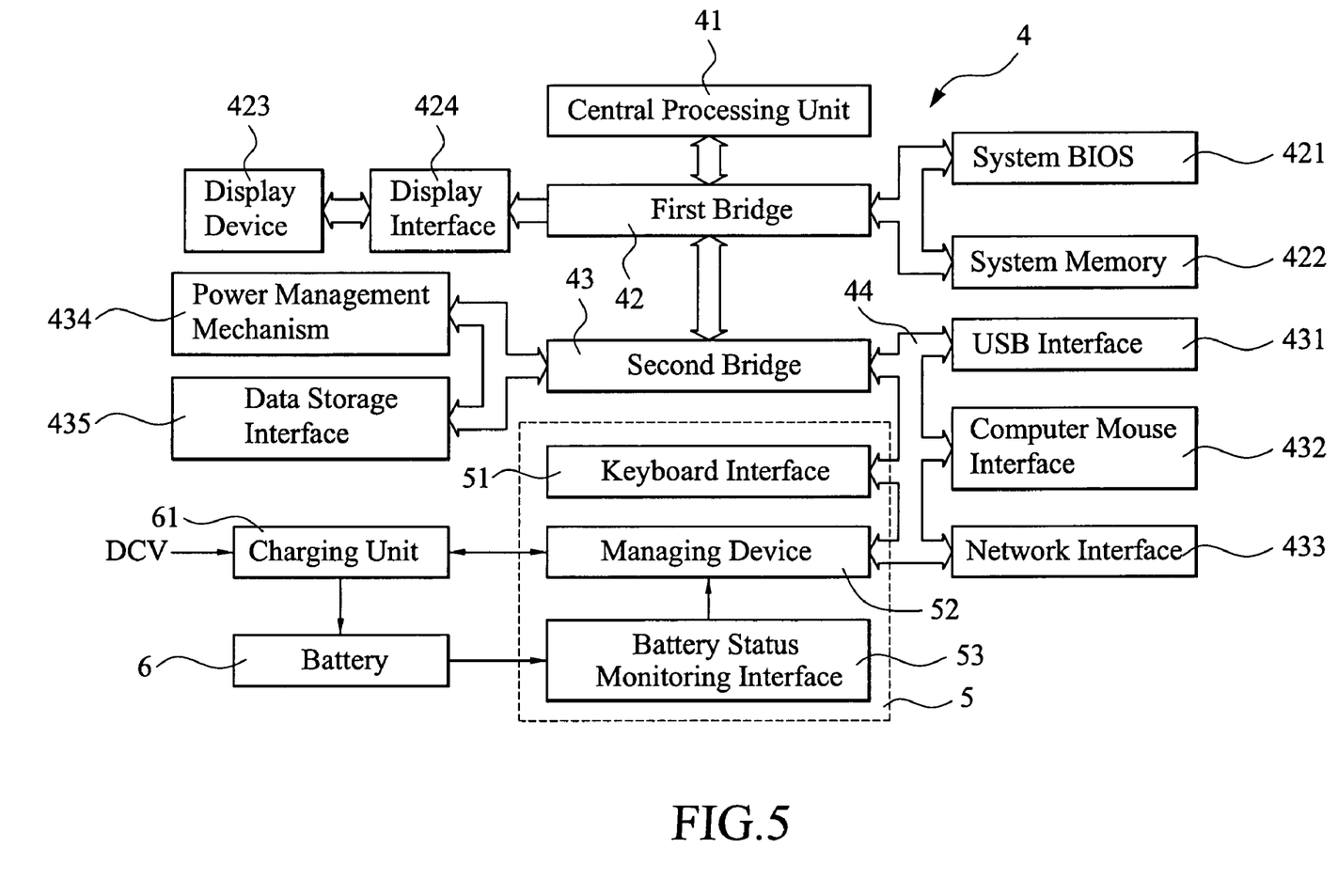
FIG. 5 is a system block diagram of a portable computer in which a method for reading battery status in accordance with a third embodiment of the present invention is embedded.

FIG. 5 is a system block diagram of a portable computer in which a method for reading battery status in accordance with a third embodiment of the present invention is embedded. It shows that a portable computer 4 mainly comprises a central processing unit 41, a first bridge (known as North Bridge) 42, and a second bridge (known as South Bridge) 43. A system BIOS 421 and a system memory 422 are coupled to the first bridge 42. A display device 423 is coupled to the first bridge 42 through a display interface 424.

The second bridge 43 is coupled with an USB interface 431, a computer mouse interface 432, a network interface 433 through a suitable bus 44 such as series Bus or parallel Bus. A power management mechanism 434 and a data storage interface 435 are connected to the second bridge 43 through suitable bus, such as known PCI bus. With an ACPI based operation system or APM based system BIOS 421, the power management mechanism 434 is capable of controlling the power saving and power management functions of the computer system.

A keyboard controller 5 is also connected to the second bridge 43 through the bus 44. The keyboard controller 5 includes a keyboard interface 51 adapted to connect a computer keyboard (not shown), a battery charging and managing device 52, and a battery status monitoring interface 53 electrically connected to a battery 6. In such configuration, the status of the battery 6 is monitored by the battery status monitoring interface 53 of the keyboard controller 5. The battery 6 may be charged by an external power source DCV via a charging unit 61.

Figure 6:
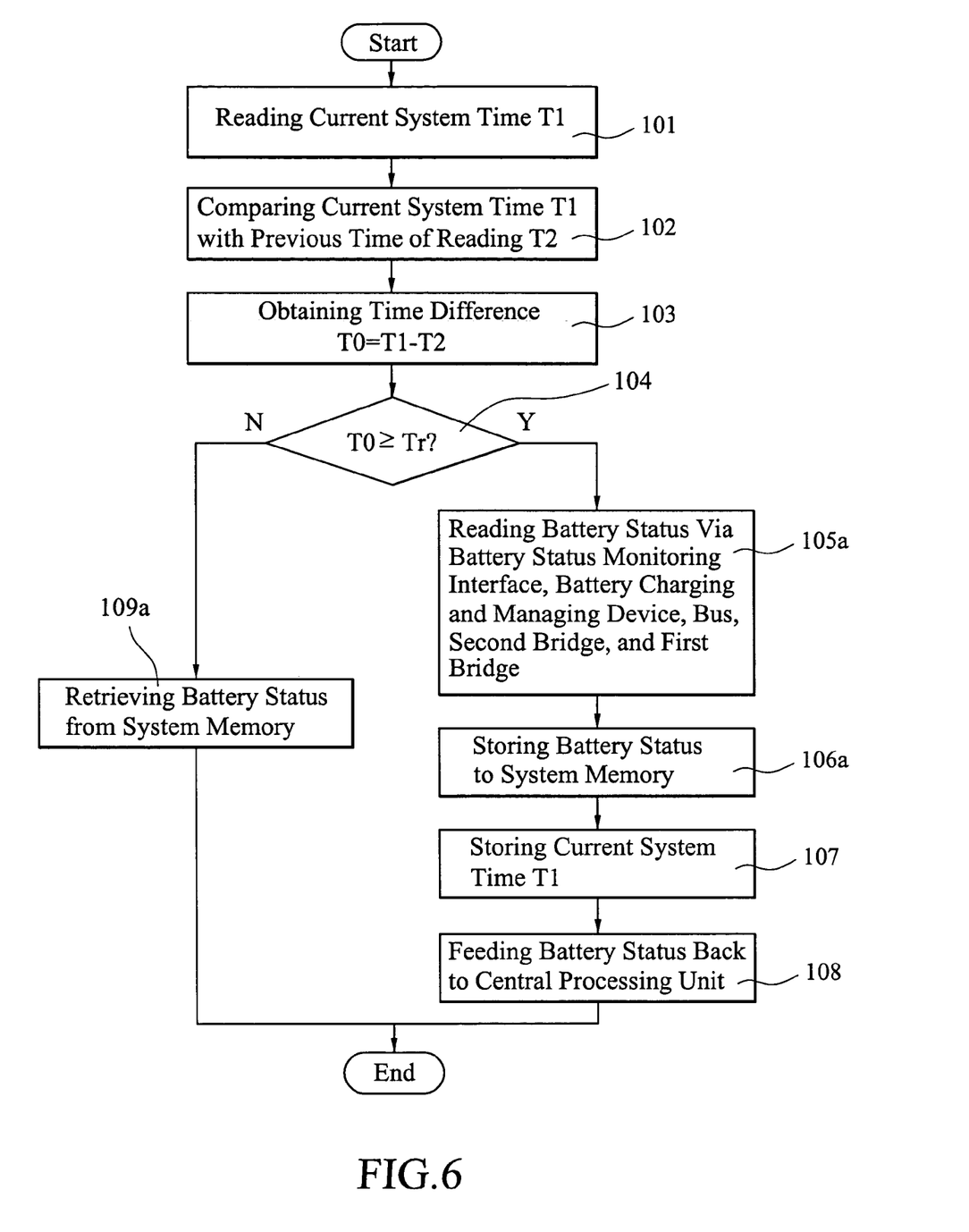
FIG. 6 is a flow chart of the method for reading battery status in accordance with the third embodiment shown in FIG. 5.

FIG. 6 shows a flow chart of a method for reading the battery status in accordance with the third embodiment shown in FIG. 5. In step 101, similar to the operation of the second embodiment of FIG. 4, the central processing unit 41 operated in an operation system reads the current system time T1 of the computer system. In step 102, the current system time T1 is compared with a time value T2 when the central processing unit 41 previously read the battery status. A time difference is obtained, namely T0=T1−T2, where T0 is the time difference, in step 103.

In step 104, the obtained time difference T0 is compared with a preset time reference Tr. If the time difference T0 is greater than or equal to the time reference Tr, the central processing unit 41 of the computer 4 reads the status of the battery 6 through the battery status monitoring interface 53, the battery charging and managing device 52, the bus 44, the second bridge 43, and the first bridge 42, step 105a, and stores the reading of the battery status to the system memory 422 which is incorporated to the first bridge 42, step 106a. The central processing unit 41 also stores the current system time T1, step 107, for comparison in the next time of reading the battery status. The reading of the battery status is then fed back to the central processing unit 41 of the computer 4, step 108.

If the comparison in step 104 indicates that the time difference T0 is smaller than the time reference Tr, the central processing unit 41 of the computer 4 simply retrieves the data stored in the system memory 422 through the first bridge 42 as the battery status and feeds the so retrieved battery status back to the central processing unit 41, step 109a.

To this point, it is apparent to those having ordinary skills that the method for reading battery status by operation system in accordance with the present invention effectively eliminates the potential problems of poor performance when the operation system is reading battery status. Further, by incorporating the characteristics of the battery, especially the capacity and variation of power consumption, the method of the present invention not only provides a measure to save resources of the central processing unit, but also allows for effective monitoring and management of the battery.

Although the present invention has been described with reference to the best mode of operation thereof, it is apparent to those skilled in the art that a variety of modifications and changes may be made without departing from the scope of the present invention which is intended to be defined by the appended claims.

What is claimed is:

1. A method for reading a battery status of a battery coupled to a portable computer operating under an operation system which reads the battery status in accordance with a preset time reference, the portable computer being provided with a central processing unit and a system memory incorporated to the central processing unit, the method comprising the following steps:
   (a) reading a current system time of the portable computer by the operation system;
   (b) comparing the current system time with a time value when the operation system previously reads the battery status of the battery, so as to obtain a time difference between the current system time and the time value;
   (c) comparing the time difference with the preset time reference;
   (d) if the time difference is greater than or equal to the preset time reference, the operation system reading the battery status of the battery and storing the battery status in the system memory and feeding the read battery status back to the operation system; and
   (e) if the time difference is smaller than the preset time reference, the operation system directly accessing the system memory to retrieve the battery status stored in the system memory and feeding the battery status back to the operation system.

2. The method as claimed in claim 1, wherein in step (d), the operation system reads the battery status of the battery by means of a keyboard controller of the portable computer.

3. The method as claimed in claim 1, wherein in step (d), the operation system further stores the current system time for comparison in next reading of the battery status of the battery.

4. A method for reading a battery status of a battery coupled to a portable computer with a central processing unit which reads the battery status in accordance with a preset time reference, the portable computer being provided with a system memory incorporated to the central processing unit, the method comprising the following steps:
   (a) reading a current system time of the portable computer;
   (b) comparing the current system time with a time value when the central processing unit previously reads the battery status of the battery, so as to obtain a time difference between the current system time and the time value;
   (c) comparing the time difference with the preset time reference;

(d) if the time difference is greater than or equal to the preset time reference, the central processing unit reading the battery status of the battery and storing the battery status in the system memory and feeding the read battery status back to the central processing unit; and (e) if the time difference is smaller than the preset time reference, the central processing unit directly accessing the system memory to retrieve the battery status stored in the system memory and feeding the battery status back to the central processing unit.

5. The method as claimed in claim 4, wherein in step (d), the central processing unit reads the battery status of the battery by means of a keyboard controller of the portable computer.

6. The method as claimed in claim 4, wherein in step (d), the central processing unit further stores the current system time for comparison in next reading of the battery status of the battery.

* * * * *